United States Patent [19]

Barbieux

[11] Patent Number: 4,946,177
[45] Date of Patent: Aug. 7, 1990

[54] SYSTEM FOR RAPIDLY CHANGING CLAMPING JAWS ON A MACHINE TOOL

[75] Inventor: Jacques Barbieux, Louvres, France

[73] Assignee: Sandvik Tobler S.A., Louvres, France

[21] Appl. No.: 380,108

[22] Filed: Jul. 14, 1989

[30] Foreign Application Priority Data

Jul. 21, 1988 [FR] France .................. 88 09874

[51] Int. Cl.$^5$ .............................................. B23B 5/34
[52] U.S. Cl. .................................. 279/123; 279/15 J; 279/2 R
[58] Field of Search ............ 279/123, 2 R, 1 B, 15 J, 279/110

[56] References Cited

U.S. PATENT DOCUMENTS

| | | | |
|---|---|---|---|
| 4,026,566 | 5/1977 | Rohm | 279/123 |
| 4,667,971 | 5/1987 | Norton et al. | 279/123 X |
| 4,763,906 | 8/1988 | Barbieux | 279/123 |

FOREIGN PATENT DOCUMENTS

| | | | |
|---|---|---|---|
| 2218637 | 10/1973 | Fed. Rep. of Germany | 279/110 |
| 2949613 | 6/1981 | Fed. Rep. of Germany | 279/110 |

Primary Examiner—Z. R. Bilinsky
Attorney, Agent, or Firm—Burns, Doane, Swecker & Mathis

[57] ABSTRACT

A system is provided for the rapid change, among others, of clamping jaws on a machine-tool which comprises self-blocking means for locking a jaw for clamping a workpiece from the inside or a jaw for clamping a workpiece from the outside. The jaw-holder is provided with at least two bearing portions for said jaws, the bearing faces being slanted through an angle $\alpha$ and $\gamma$ respectively. These faces cooperate in the blocked position with corresponding bearing faces of the jaws. One of the ends of an assembly has a face slanted through an angle $\beta$ whereas another face is slanted through an angle $\delta$. These faces cooperate in the blocked position with a corresponding bearing face respectively of one of the jaws.

8 Claims, 3 Drawing Sheets

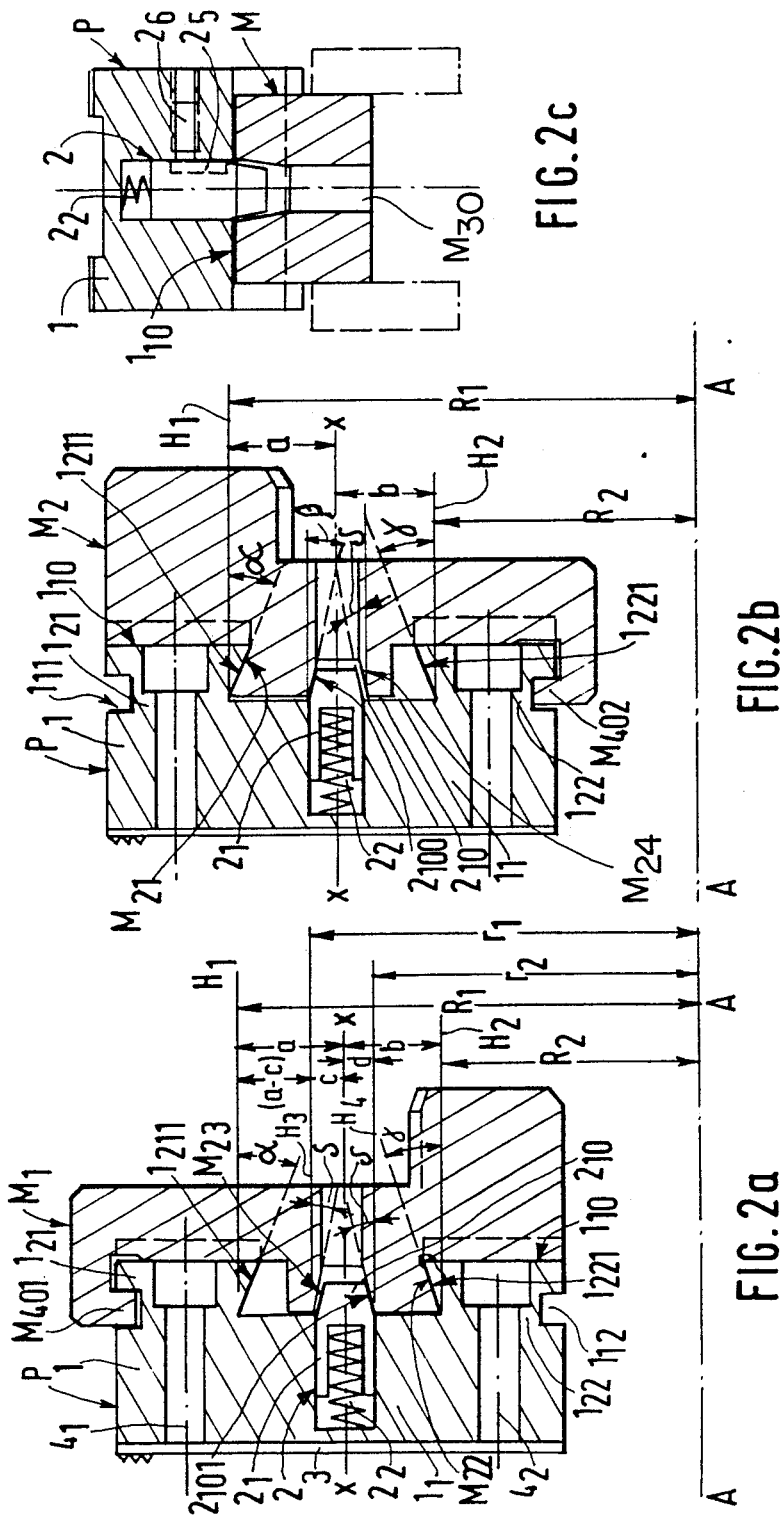

SYSTEM FOR RAPIDLY CHANGING CLAMPING JAWS ON A MACHINE TOOL

BACKGROUND OF THE INVENTION

The present invention relates to a system for rapidly changing the clamping jaws on a machine-tool, which may be used for clamping the workpiece to the clamped not only from the inside but also from the outside, for use in repetitive and successive machining operations from the outside or inside the workpieces.

In French Patent Application 85/10958 of Jul. 17, 1985 (corresponding to U.S. Pat. No. 4,763,906), the Applicant described a system for rapidly changing the clamping jaws on a machine tool, comprising self-locking means for locking the jaws M on the jaw-holder P. The self-locking means is formed essentially by a locking element 1 having a base $1_1$ on abutment face $1_{10}$ of which said jaw M rests in the locked position and a bearing portion $1_2$ for the jaw M, a bearing face $1_{20}$ of bearing portion $1_2$ is slanted through an angle $\alpha$ with respect to a horizontal plane perpendicular to the plane vertical to said face $1_{10}$ of said base $1_1$ for cooperating in the locked position with a corresponding bearing face $M_{20}$ of the jaw M on the one hand and, on the other hand, by at least one assembly 2 for maintaining said jaw in the locked position. One of the ends $2_{10}$ of a mobile member $2_1$ of said assembly 2 has at least one pushing face $2_{100}$ slanted through an angle $\beta$ with respect to a horizontal plane perpendicular to the plane vertical to said face $1_{10}$ of said base $1_1$ for cooperating, in the locked position, with a corresponding bearing face $M_{20}$ of the jaw M, said angles $\alpha$ and $\beta$ being open in the same direction, said angle $\alpha$ being greater than said angle $\beta$. The assembly 2 further comprises means $2_1$, $2_2$ for unblocking ande unlocking said jaw M (see FIG. 1).

The angle $\alpha$ is 1.4 to 2 times the angle $\beta$ and the difference between the angles $\alpha - \beta$ is of the order of 7° to 10°.

$$\alpha = 1.4 \div 2; \alpha - \beta : 7° \div 10°$$

The size of angle $\alpha$ is preferably from 15° to 30° and that of angle $\beta$ is preferably from 7° to 20°.

The device described in that patent does not allow the jaw to be used from clamping from the outside and/or from the inside of the workpiece to be machined thus requiring the jaw-holder to be changed and/or the jaws for each machining mode. The result is a considerable loss of time, complication due to the multiplicity of jaw-holders and jaws required, and a relatively high production cost.

The object of the present invention is to overcome these drawbacks.

SUMMARY OF THE INVENTION

In accordance with the present invention, the system for rapidly changing, interalia, clamping jaws on a machine-tool is characterized in that it comprises self-blocking means for locking a jaw $M_1$ for clamping a workpiece from the inside or a jaw $M_2$ for clamping a workpiece from the outside on a jaw-holder P, these means being formed essentially by a blocking element having an abutment face against which the jaws $M_1$, $M_2$ rest in the blocked position and at least two bearing faces for said jaws $M_1$, $M_2$, the bearing faces being slanted through an angle $\alpha$ and $\gamma$ respectively with respect to horizontal planes $H_1$, $H_2$ perpendicular to the plane vertical to the face of the base for cooperating in the blocked position, with corresponding bearing faces of the jaws $M_1$, $M_2$ on the one hand and, on the other, by at least one retainer for holding said jaws $M_1$ or $M_2$ in the blocked position. One end of the retainer has a bearing face slanted through an angle $\beta$ with respect to a horizontal plane $H_3$ perpendicular to the plane vertical to the abutment face whereas another bearing face of the pusher is slanted through an angle $\delta$ with respect to a horizontal plane $H_4$ for cooperating in the blocked position with the corresponding bearing face respectively of one of the jaws $M_2$ or $M_1$. The angles $\alpha$, $\beta$, $\gamma$, $\delta$, are open in the same direction, the angles $\alpha$, $\gamma$ are larger than the angles $\beta$, $\delta$, respectively. The assembly further comprises means, known per se, for unblocking and unlocking one of the said jaws $M_1$, $M_2$.

Planes $H_1$ and $H_2$ are at a distance $R_1$ and $R_2$ respectively with respect to a horizontal plane passing through the axis A—A of the mandrel, $R_1$ being larger than $R_2$, the plane $H_1$ being situated at a distance a from a horizontal plane passing through the axis x—x of the assembly 2 for holding a jaw $M_1$, $M_2$ in the blocked position, whereas the plane $H_2$ is a distance b from the plane passing through the axis x—x.

Plane $H_3$ is at a distance $r_1$ from the horizontal plane passing through the axis A—A and the plane $H_4$ is at a distance $r_2$ from plane passing through the axis A—A, $r_1$ being larger than $r_2$; said planes $H_3$ and $H_4$ being at a distance c and d respectively with respect to said plane passing through a axis x—x.

The distance a may be equal to b.

The distance c may be equal to d.

Angle $\alpha$ may be equal to the angle $\gamma$.

The angle $\beta$ may be equal to the angle $\delta$.

Finally, each jaw $M_1$, $M_2$ comprises a heel which, during blocking and locking of one of jaws $M_1$, $M_2$, is housed in a corresponding recess in the peripheral part of the base of the element of the jaw-holder.

Other advantages and features will be clear from the following test and the accompanying figures, given solely by way of example.

The text and the figures relate to a mandrel such as used in machine-tools where, in general, the workpiece to be machined and/or the tool are driven with a rotary movement. This system for the rapid change of a removable member on a fixed member, such as a jaw on a jaw-holder, may however be used within the scope of the invention for clamping very different workpieces, for example on a planer, a shaper, assembly installations, or the like after making the modifications necessary for adapting the system of the invention to the desired use.

BRIEF DESCRIPTION OF THE DRAWINGS

FIG. 2a shows in section a system in accordance with the invention for clamping a workpiece from the inside, FIG. 2b shows in section a system in accordance with the invention for clamping a workpiece from the outside, FIG. 2 shows a cross section passing through the axis x—x of the assembly of the system of the invention.

DESCRIPTION OF THE PREFERRED EMBODIMENTS

The principle of blocking and locking the jaws (self-locking) on the jaw-holder is substantially identical to that described in the above referenced French patent application 85 10958, permitting a very great repetitivity of the operation, with high accuracy of fitting the jaw on the jaw-holder and very low wear of the members forming part of the rapid exchange system.

Figure 1:
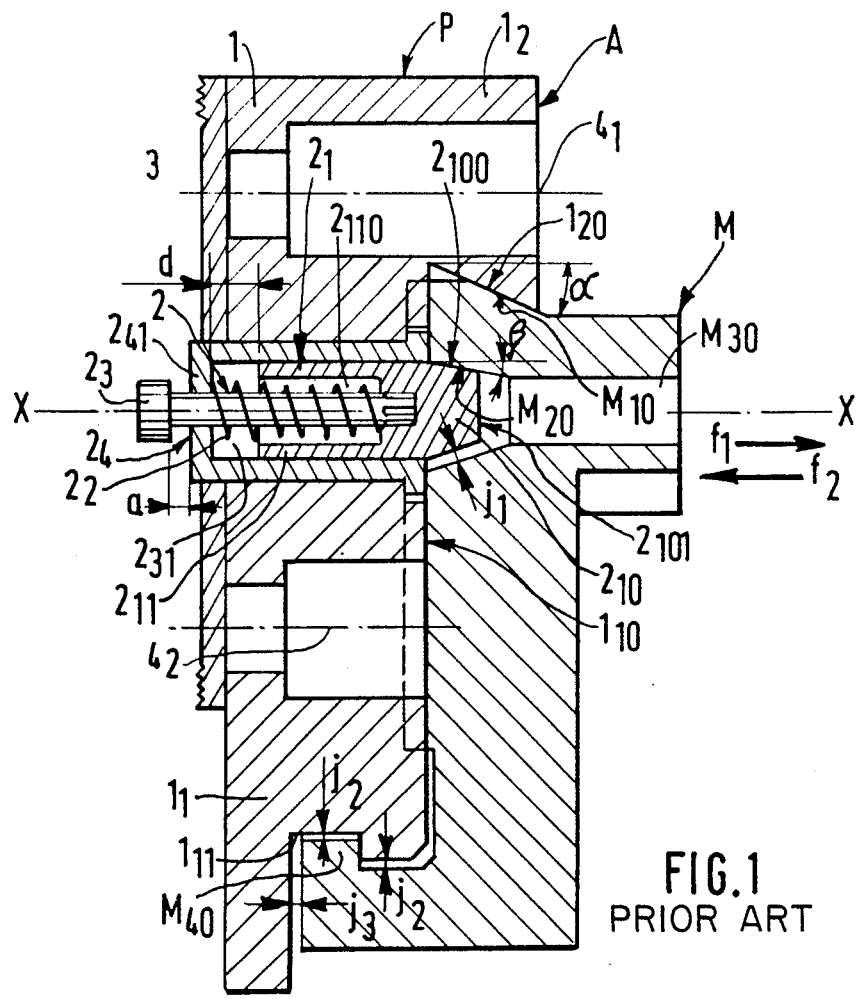
FIG. 1 shows in section a system such as described in French patent 85 10958.
Figure 4A:
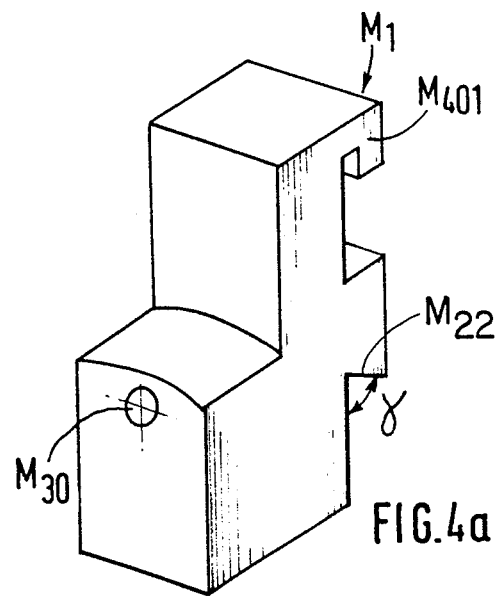
FIGS. 4a, 4b, 4c show in perspective jaws for clamping workpieces from the inside, from the outside and a jaw blank.
Figure 3:
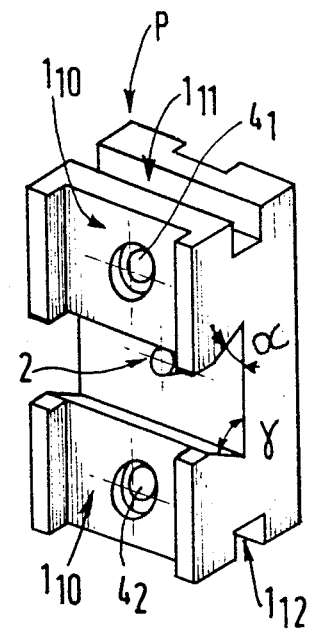
FIG. 3 shows in perspective a jaw-holder of the system of the invention.
Figure 4B:
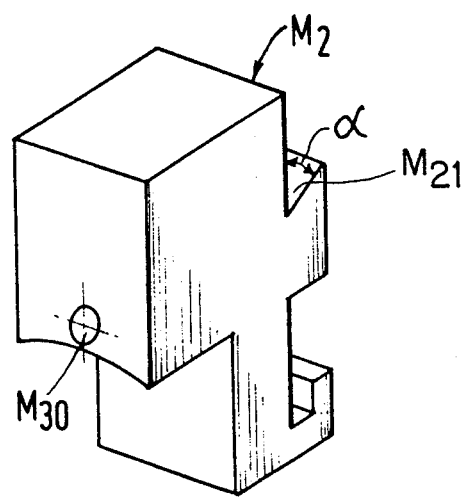
Figure 4C:
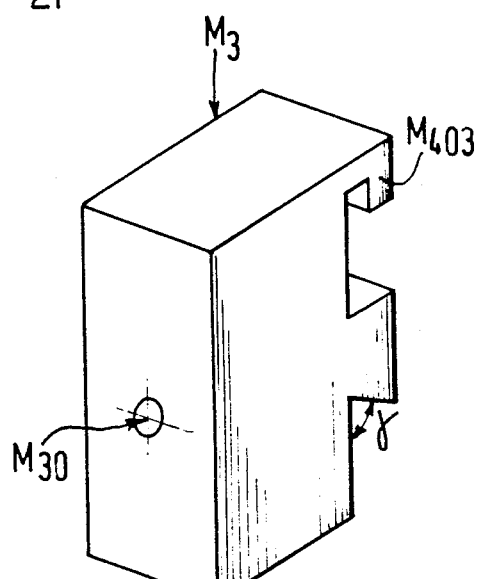

As is shown in FIGS. 2a, 2b, 2c and 3, the jaw-holder P is formed so as to be able to be used for inside clamping jaws $M_1$ for clamping a workpiece (not shown in the drawings) from the inside or for inside clamping jaws $M_2$ for clamping a workpiece from the outside.

In fact, the jaw-holder P comprises a blocking element 1, an assembly 2 for holding the jaws $M_1$ or $M_2$ in the blocked and locked position, a toothed zone 3, for example on the lower face of the element 1 for holding the jaw-holder P in position on the mandrel (not shown in the drawings) whose main axis is A—A. The jaw-holder P is fixed on the mandrel by screws $4_1$, $4_2$ or similar fasteners.

The element 1 comprises a base $1_1$ and bearing portions $1_{21}$ and $1_{22}$ for the jaw $M_1$ and the jaw $M_2$ respectively. These bearing portions are defined on the jaw $M_1$ side by a bearing face $1_{221}$ slanted through an angle $\gamma$ with respect to a horizontal plane $H_2$ perpendicular to the plane vertical to the face $1_{10}$ of said base $1_1$; and on the jaw $M_2$ side by a bearing face $1_{211}$ slanted through an angle $\alpha$ with respect to a plane $H_1$ which is a perpendicular to a vertical plane defined by the abutment face $1_{10}$.

The assembly 2 comprises essentially a cylindrical jacket in which a retainer or pusher $2_1$ may move under the action of a spring $2_2$, along the axis x—x, which pusher has a substantially conical front end or head $2_{10}$ or two planes slanted through an angle $\beta$ and $\delta$ respectively. A groove $2_5$ may be provided in pusher $2_1$ for holding it in the blocked and locked position or in the unblocked and unlocked position by means of a finger $2_6$ screwed into the fixed element 1. As has already been mentioned above, an (upper) portion of the head $2_{10}$ has a bearing face $2_{100}$ slanted through an angle $\beta$ with respect to a horizontal plane $H_3$ perpendicular to the plane vertical to face $1_{10}$, and a (lower) portion of head $2_{10}$ has a bearing face $2_{101}$ slanted through an angle $\delta$ with respect to a horizontal plane $H_4$.

Each jaw $M_1$ and $M_2$ comprises at one of its ends slanted or inclined reaction faces $M_{23}$, $M_{24}$ adapted to be contacted by the bearing faces $2_{100}$ and $2_{101}$ of the pusher 2. Each jaw $M_1$ and $M_2$ also includes at one of its ends a slanted contact face $M_{21}$ and $M_{22}$ respectively; the slant angle of face $M_{22}$ is equal to the slant angle $\gamma$ of face $1_{221}$ of element 1 and the slant angle of face $M_{221}$ is equal to the slant angle $\alpha$ of face $1_{211}$ of element 1. In the blocked position of jaw $M_1$ on the jaw-holder P, i.e., when the contact face $2_{201}$ pushes against the reaction face $M_{24}$, the slanted face $M_{22}$ of jaw $M_1$ cooperates with the slanted face $1_{221}$ of the jaw-holder P; similarly, in the blocked position of jaw $M_2$ on the jaw-holder P, wherein the contact face $2_{100}$ pushes against the reaction face $M_{23}$, the slanted face $M_{21}$ of jaw $M_2$ cooperates with the slanted face $1_{211}$ of the jaw-holder P. The other end of each jaw $M_1$ and $M_2$ comprises a heel $M_{401}$ and $M_{402}$ respectively which is housed, in the blocked position, in one of the recesses $1_{11}$ and $1_{12}$ respectively; these recesses are formed diametrically opposite in the periphery of the base $1_1$ of element 1. It is thus possible to fit on jaw-holder P either at least one jaw $M_1$ for clamping from the inside, or at least one jaw $M_2$ for clamping from the outside a workpiece to be machined, for example. To provide blocking and locking of jaw $M_1$, in the locked position, a slanted face $M_{22}$ of jaw $M_1$ cooperates with the slanted face $1_{221}$ of jaw-holder P, the slant angle $\gamma$ of faces $M_{22}$ and $1_{221}$ being identical. Similarly, in the locked position of jaw $M_2$, its slanted face $M_{21}$ cooperates with the slanted face $1_{211}$ of jaw-holder P, the slant angle $\alpha$ of faces $M_{22}$ and $1_{221}$ being identical.

The horizontal planes $H_1$, $H_2$, $H_3$, $H_4$ are at distances $R_1$, $R_2$, $r_1$ and $r_2$ from a horizontal plane passing through the longitudinal axis A—A of the mandrel: $R_1 > r_1 > r_2 > R_2$. The planes $H_1$ and $H_2$ are at distances a and b respectively from a horizontal plane passing through the axis x—x, and the planes $H_3$ and $H_4$ at distances c and d respectively from this same horizontal plane passing through the axis x—x. The distance a-c is therefore equal to $R_1 - r_1$. The angle $\alpha$ is always greater than the angle $\beta$ and the angle $\gamma$ is always greater than the angle $\delta$.

It is thus possible, by modifying, depending on the needs, at least one of the distances $R_1$, $r_1$, $r_2$ an d$R_2$ t form a range of jaws for clamping a workpiece from the inside or from the outside. In particular, for a=b and c=d, the angle $\alpha$ is equal to angle $\gamma$ and the angle $\beta$ is equal to the angle $\delta$; this permits the use of the same jaw for clamping a workpiece from the inside and/or from the outside.

Numerous modifications and/or improvements may be made to the systems described above without departing from the scope of the invention.

What is claimed is:

1. A workpiece holding mechanism adapted for a rapid interchange of inside and outside clamping jaws which clamp workpieces from the inside and outside, respectively, of the workpieces; said mechanism including a locking element having an abutment face against which a respective jaw rests when in a blocked and locked position, said blocking element including first and second bearing faces inclined at first and second angles, respectively, relative to imaginary planes disposed perpendicularly to said abutment face; said inside and outside clamping jaws each having an inclined contact face arranged to engage the respective one of said first and second bearing faces when a respective jaw is in a blocked and locked position; retaining means for retaining a respective jaw in a blocked and locked position comprising a retaining member having at one end thereof third and fourth bearing faces inclined at third and fourth angles, respectively, relative to imaginary planes disposed perpendicular to said abutment face, each of said inside and outside clamping jaws including an inclined reaction face arranged to be engaged by a respective one of said third and fourth bearing faces such that when said reaction face of said inside clamping jaw is engaged by said third bearing face said contact surface of said inside clamping jaw is urged against said first bearing surface, and when said reaction face of said outside clamping jaw is engaged by said fourth bearing face said contact surface of said outside clamping jaw is urged against said second bearing surface; all of said first, second third, and fourth angles being open in the same direction; said first and second angles being larger than said third and fourth angles, respectively; and means for enabling said retaining means to be released relative to said reaction surface of a respective jaw for unblocking and unlocking said jaw.

2. A mechanism according to claim 1, wherein said blocking element is situated against a longitudinal first axis defined by a mandrel, said second blocking face disposed farther from said first axis than said first blocking face, said retaining means comprising a pusher member movable along a second axis, said first and second bearing faces spaced from said second axis on opposite sides thereof.

3. A mechanism according to claim 2, wherein said fourth bearing face is disposed farther from said first axis than said third bearing face, said third and fourth bearing faces spaced from said second axis on opposite sides thereof.

4. A mechanism according to claim 2, wherein said first and second bearing faces are spaced equal distances from said second axis.

5. A mechanism according to claim 3, wherein said third and fourth bearing faces are spaced equal distances from said second axis.

6. A mechanism according to calim 1, wherein said first and second angles are equal.

7. A mechanism according to claim 2, wherein said third and fourth angles are equal.

8. A mechanism according to claim 1, wherein said blocking element includes first and second recesses, said first recess disposed closer to said first axis than said second axis, said inside clamping jaw including a first heel arranged to be received in said first recess, said outside clamping jaw including a second heel arranged to be received in said second recess.

* * * * *